(12) United States Patent
Hoskinson et al.

(10) Patent No.: US 8,469,784 B1
(45) Date of Patent: Jun. 25, 2013

(54) AUTONOMOUS GRAIN COMBINE CONTROL SYSTEM

(75) Inventors: Reed L. Hoskinson, Rigby, ID (US);
Kevin L. Kenney, Idaho Falls, ID (US);
James R. Lucas, Naperville, IL (US);
Marvin A. Prickel, Lockport, IL (US)

(73) Assignee: U.S. Department of Energy, Washington, DC (US)

( * ) Notice: Subject to any disclaimer, the term of this patent is extended or adjusted under 35 U.S.C. 154(b) by 382 days.

(21) Appl. No.: 12/761,453

(22) Filed: Apr. 16, 2010

(51) Int. Cl.
*A01D 75/18* (2006.01)

(52) U.S. Cl.
USPC .......................................... 460/4; 460/1; 460/5

(58) Field of Classification Search
USPC ............................................. 460/1, 4–6, 101
See application file for complete search history.

(56) References Cited

U.S. PATENT DOCUMENTS

| | | | |
|---|---|---|---|
| 3,939,846 A * | 2/1976 | Drozhzhin et al. | 460/1 |
| 4,259,829 A * | 4/1981 | Strubbe | 460/5 |
| 4,727,710 A * | 3/1988 | Kuhn | 56/10.2 G |
| 6,591,145 B1 | 7/2003 | Hoskinson et al. | |
| 6,726,559 B2 * | 4/2004 | Bischoff | 460/1 |
| 7,311,013 B1 | 12/2007 | Hoskinson et al. | |
| 7,367,880 B2 | 5/2008 | Hoskinson et al. | |
| 7,670,218 B2 * | 3/2010 | Behnke et al. | 460/4 |

* cited by examiner

*Primary Examiner* — Alicia Torres
(74) *Attorney, Agent, or Firm* — Michael J. Dobbs; Daniel D. Park; John T. Lucas

(57) ABSTRACT

A system for controlling a grain combine having a rotor/cylinder, a sieve, a fan, a concave, a feeder, a header, an engine, and a control system. The feeder of the grain combine is engaged and the header is lowered. A separator loss target, engine load target, and a sieve loss target are selected. Grain is harvested with the lowered header passing the grain through the engaged feeder. Separator loss, sieve loss, engine load and ground speed of the grain combine are continuously monitored during the harvesting. If the monitored separator loss exceeds the selected separator loss target, the speed of the rotor/cylinder, the concave setting, the engine load target, or a combination thereof is adjusted. If the monitored sieve loss exceeds the selected sieve loss target, the speed of the fan, the size of the sieve openings, or the engine load target is adjusted.

20 Claims, 10 Drawing Sheets

AUTONOMOUS GRAIN COMBINE CONTROL SYSTEM

GOVERNMENT INTERESTS

The United States Government has rights in this invention pursuant to Contract No. DE-AC07-991D13727, between the U.S. Department of Energy (DOE) and Bechtel BWXT Idaho LLC.

FIELD OF THE INVENTION

The present invention relates to a system and method for optimally controlling a grain combine.

BACKGROUND OF THE INVENTION

The goal of agricultural production is to maximize profit. A major way to do this is to minimize production cost. There are many factors that influence production cost, such as agricultural output, employee cost, and energy costs. Throughout the years, agricultural output has been maximized using factors such as the amount of water received by the growing crop, the amount and type of fertilizer provided to the crop, the amount and type of herbicides and pesticides applied to the crop, etc. However, employee cost, arising from employee time, and energy costs have been difficult to balance.

Traditionally, harvesting was performed by an experienced operator, often having a personal stake in the productivity of the harvest. However, given the decline of traditional family owned and operated farms and the rise of outsourced harvesting, there has been a large decrease in the level of experience of the operators harvesting crops. In many of these situations, hired help is paid per acre. This leaves the operator with little incentive to maximize harvesting output or to minimize crop loss or energy consumption. Sadly, this leads to suboptimal harvesting and therefore wasted crops, wasted energy, or both.

For example, a grain combine is used to extract grain from a field, separating out the grain from the rest of the crop. As the grain combine moves through a grain field, the header cuts (in the case of small grains) or picks (in the case of corn) the crop as the grain combine passes through the field. The crop is then fed from the header into a separator. In the separator, the crop rubs between a rotor/cylinder and a concave in order to separate the grain from the remainder of the crop, the material other than grain (MOG). The grain that is separated from the crop along with fines generated from the separator is transferred to the cleaning system and the remaining plant residue is directed to the rear of the grain combine for discharge. The biomass residue mixed with the grain in the cleaning system is referred to as MOG. The cleaning system typically consists of one or more sieves and a cleaning fan. The separated grain is cleaned by passing it over one or more sieves while a fan blows up through or across the sieves separating the lighter MOG from the more dense grain. At this point, the grain falls through the sieves and is moved to the grain tank and the MOG is expelled out the back of the grain combine.

During the operation of the grain combine, there are various adjustments the operator can make to optimize the harvesting process. For example, the operator may control the ground speed, size of the sieve openings, the speed of said fan, the concave setting (the gap between the concave and the rotor/cylinder), rotor/cylinder speed, etc. A skilled operator may have some success optimizing some of these adjustments (settings) based on their experience and through trial and error. However, an unskilled operator or even a skilled operator operating a grain combine in an unfamiliar field or unfamiliar conditions, such as plant density or moisture, is ill-equipped to properly adjust these grain combine operating conditions. Furthermore, as the optimal adjustments will vary even within the same crop across a field, the operator must be able to dynamically adjust settings during a harvest. In many cases, due to the complexity and interaction of such adjustments, only the ground speed is altered if the operator determines that excess crop is being lost. Additionally, even if the operator could account for all of the changes during harvesting, constantly changing all of these adjustments would overly distract the operator from his primary concerns for proper grain combine operation and safety.

Therefore, there is a need to automatically adjust, as well as monitor, the systems and methods that operate within a grain combine such that the product yield is maximized.

SUMMARY OF THE INVENTION

A system for controlling a grain combine having a rotor/cylinder, a sieve, a fan, a concave, a feeder, a header, an engine, and a control system. The system has two main functions, a grain loss control and a feed rate control function. The purpose of the grain loss control is to control grain loss to a specified limit by adjusting components of the combine separator and cleaning systems. The function of the feed rate control is to control combine ground speed to maintain optimum performance of the combine as crop conditions and field conditions vary.

The grain loss (an aggregate of separator loss and sieve loss) control is described as follows: The feeder of the grain combine is engaged and the header is lowered. A separator loss target, engine load target, and a sieve loss target are selected. Grain is harvested with the lowered header passing the grain through the engaged feeder. Separator loss, sieve loss, engine load and ground speed of the grain combine are continuously monitored during the harvesting. If the monitored separator loss exceeds the selected separator loss target, the speed of the rotor/cylinder, the concave setting, the engine load target, or a combination thereof is adjusted. If the monitored sieve loss exceeds the selected sieve loss target, the speed of the fan, the size of the sieve openings, or a combination thereof is incrementally adjusted to improve cleaning system performance and reduce sieve loss. If these adjustments are unsuccessful in reducing sieve loss below the sieve loss target then the engine load target is reduced to reduce the speed of the grain combine.

The feed rate control is described as follows: A combine engine load target is selected. Combine ground speed control is transferred from the operator to the control system. Combine engine power is continuously monitored (preferably every second) and ground speed is adjusted to control the mass feed rate of the crop entering the combine header to maintain the engine load target. The feed rate control contains several variants that are activated in specific circumstances.

DETAILED DESCRIPTION OF THE INVENTION

Figure 1:
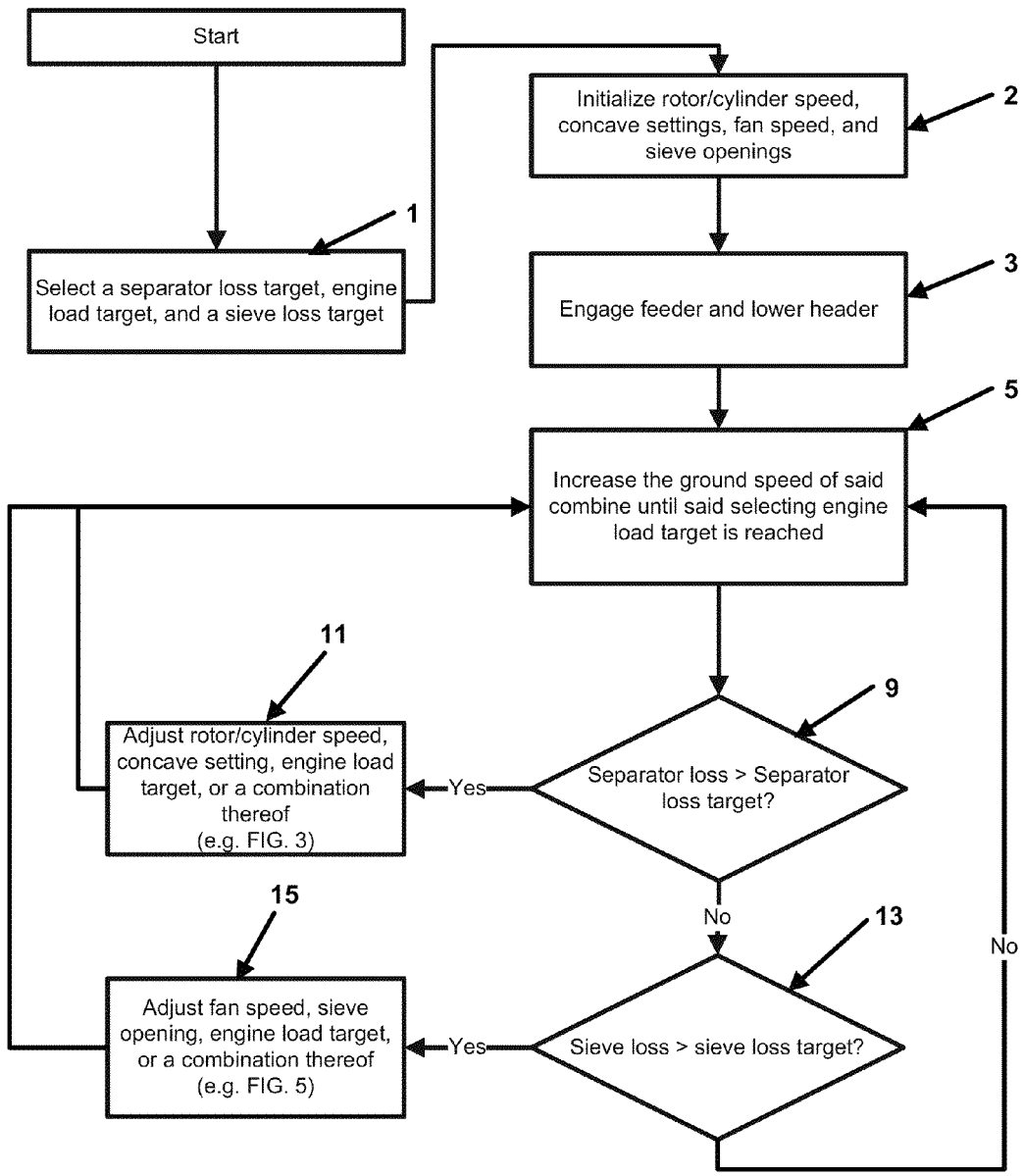
FIG. 1 depicts a flowchart of the operation of one embodiment of an autonomous grain combine control system.

A system for controlling a grain combine comprising a control system. The grain combine comprising a rotor/cylinder, a sieve, a fan, a concave, a feeder, a header, and an engine. The system has two main functions, a grain loss control and biomass feed rate control. The purpose of the grain loss control is to control grain loss to a preselected limit by adjusting components of the combine separator and cleaning systems. The feed rate control is to control combine ground speed in order to maintain optimum performance of the combine as crop conditions and field conditions vary.

The grain loss (an aggregate of separator loss and sieve loss) control is described as follows: The feeder of the combine is engaged and the header is lowered. A separator loss target, engine load target, and a sieve loss target are selected. Grain is harvested with the lowered header passing the grain through the engaged feeder. Separator loss, sieve loss, engine load and ground speed of the combine are continuously monitored during the harvesting. If the monitored separator loss exceeds the selected separator loss target, the speed of the rotor/cylinder, the concave setting, the engine load target, or a combination thereof is adjusted. If the monitored sieve loss exceeds the selected sieve loss target, the speed of the fan, the size of the sieve openings, or a combination thereof is incrementally adjusted to improve cleaning system performance and reduce sieve loss. If these adjustments are unsuccessful in reducing sieve loss below the sieve loss target then the engine load target is reduced to reduce the speed of the combine.

The feed rate control is described as follows: A combine engine load target is selected. Combine ground speed control is transferred from the operator to the control system. The combine engine power is continuously monitored (preferably every second) and ground speed is adjusted to control the biomass feed rate of the crop entering the header to maintain the engine load target. The feed rate control contains several variants that are activated in specific circumstances. These variants are described in the next two paragraphs.

In a preferred embodiment, a headlands routine is implemented when an operator raises the header. In this mode, any ground speed adjustments in the optimization routines are temporarily suspended while the header is raised. Preferably, when in the headlands routine the control system learns the operators preferred ground speed while the header is up and automatically adjusts the combine to the operator's preferred ground speed in future headlands operations. This routine is preferred as it will automatically suspend feed rate control and maintain autonomous control while turning the combine through the headlands.

In a preferred embodiment, an unloading routine is implemented when the unload tube on the combine is extended in an outward position. In this mode, any ground speed adjustments in the optimization routines are temporarily suspended while the unload auger is engaged. Once the unload auger is disengaged, normal control system operations resume. This routine is preferred as it will keep the combine at a constant ground speed thereby allowing a grain cart to easily follow along side by matching the combine's constant ground speed during unloading.

Grain Combine

Figure 9:
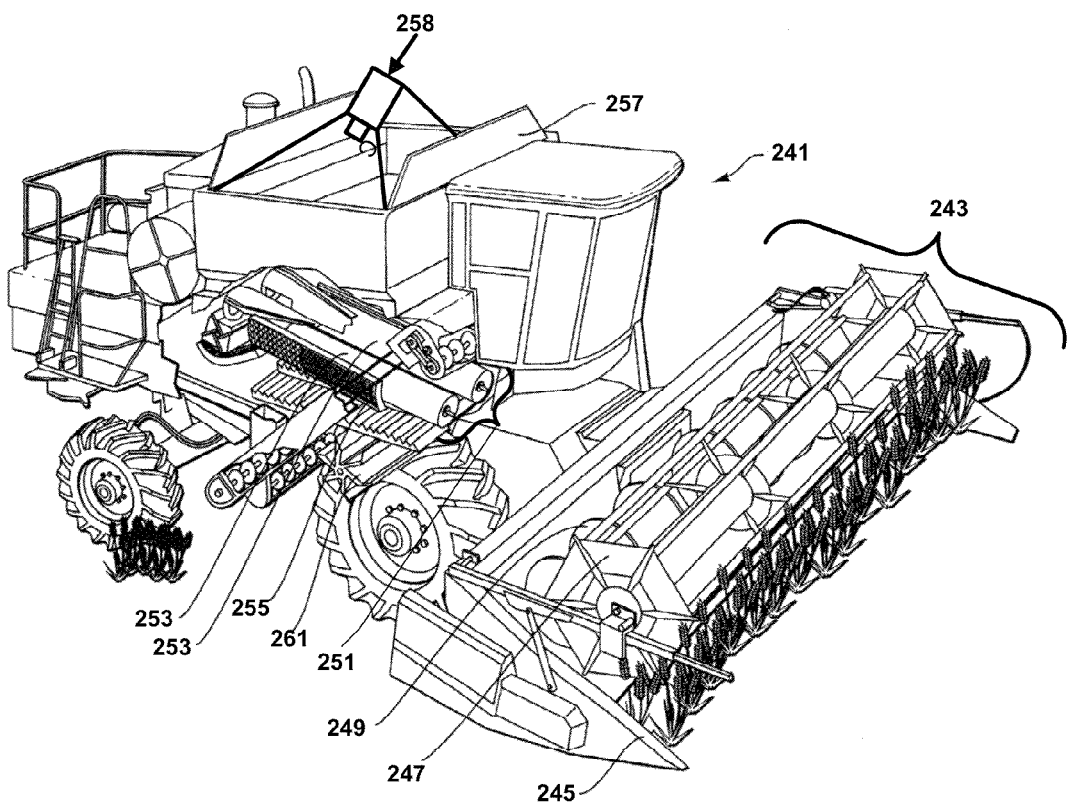
FIG. 9 depicts a perspective view of one embodiment of a grain combine.
Figure 10:
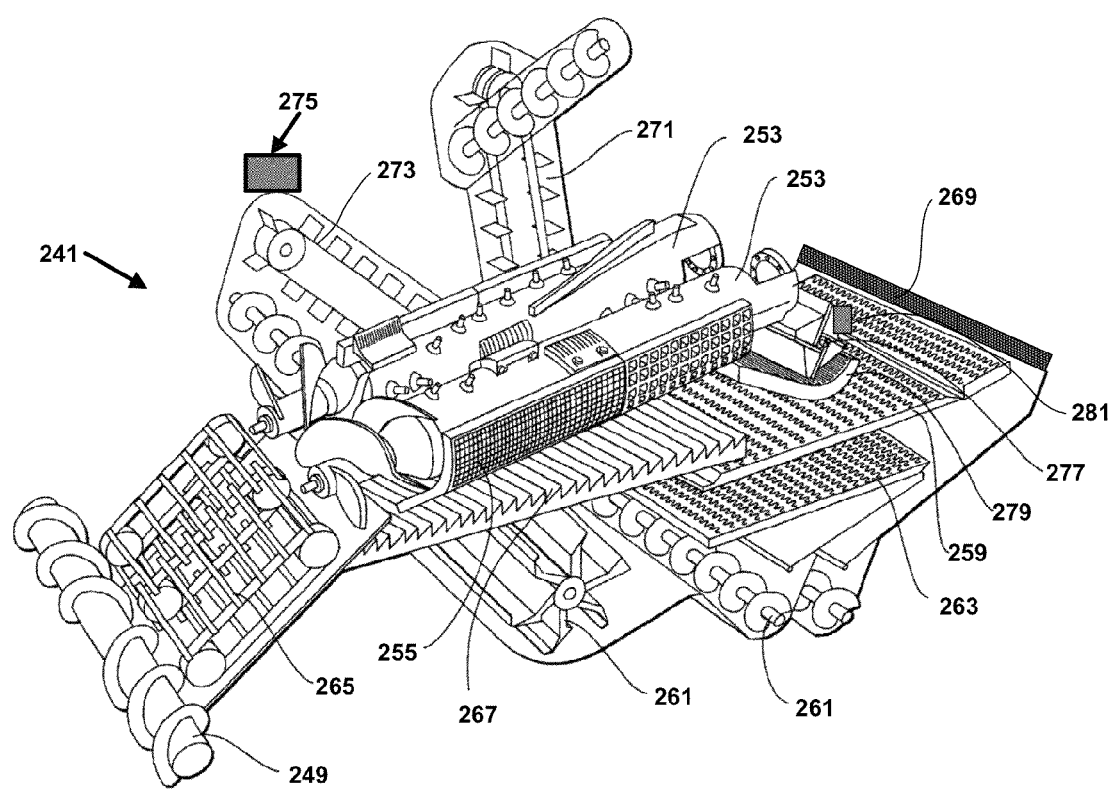
FIG. 10 depicts a cut-out perspective view of one embodiment of a grain combine.

The grain combine is a vehicle that comprises a rotor/cylinder, a sieve, a fan, a concave, a feeder, a header, and an engine. FIG. 9 and FIG. 10 depict a preferred embodiment of a combine. The header is any means of extracting grain from a field. A header may be of two main types. A platform header is used in small grains (wheat, barley, soybeans, oats, rice, etc.) to cut the standing crop. A corn header is used specifically for corn to pick the ears from the standing crop. The header then transfers the crop via an auger or conveyor to the feeder.

The feeder then moves the grain off the header and into the separator comprising the rotor/cylinder and the concave. If the rotor/cylinder is a cylinder, it rotates perpendicular to the traveling direction of the combine during harvesting. However, if the rotor/cylinder is a rotor, it rotates parallel to the traveling direction of the combine during harvesting. The rotor/cylinder rotates against a concave, which causes a rubbing action which threshes grain passing along the rotor/cylinder. For clarity a single rotor/cylinder is discussed, although any number of rotors/cylinders may be used. Preferably, the combine has one or two rotors, or a single cylinder. The rotor/cylinder speed, the rotational speed of the rotor/cylinder is preferably controlled by a control system to optimize grain harvest. Various means may be used to control the speed of the rotor/cylinder, for example the engine speed may be changed, however variable coupling systems such as a variable transmission, or any belt, chain, or gear based system capable of altering the ratio of turns from the engine coupling to the rotor/cylinder may be used.

The concave has a plurality of openings, which preferably are manually adjustable. The concave setting, the gap between the concave and the rotor/cylinder, is adjustable and allows threshed grain to pass through. The distance between the concave and the rotor/cylinder is referred to as the concave setting, and is preferably adjusted by a control system, whereby the control system can automatically adjust the concave setting. Various means may be used to adjust the concave setting, for example one or more motors, hydraulic cylinders, servo motors, or any other mechanical control means may be used to adjust the concave setting.

The threshed grain is then cleaned by the combine cleaning system that comprises a fan and sieves. Preferably, the fan is used to separate the grain (e.g. corn, rice, wheat, barely, sorghum, millets, oats, rye, buckwheat, etc.) from the material other than grain (MOG) (e.g., chaff, straw, stalk, etc.). The fan speed is preferably optimized by a control system whereby a significant portion of the MOG is blown out the back of the combine or alternately moved to a different machine that collects, processes, and/or transports the MOG. Various means may be used to control the speed of the fan, for example the engine speed may be changed, however variable coupling systems such as a variable transmission, or any belt, chain, or gear based system capable of altering the ratio of turns from the engine coupling to the fan may be used.

Preferably, the grain falls through the sieves and is moved into the clean grain tank. Preferably, the size of the sieve openings is optimized by a control system whereby a substantial portion of the grain is allowed to pass through the sieve openings, while a substantial portion of the MOG is not allowed to pass through the sieve openings. Various means may be used to adjust the sieve openings, for example one or more motors, hydraulic cylinders, servo motors, or any other mechanical control means may be used to adjust the sieve openings. Preferably, an upper sieve and a lower sieve are used as shown in FIG. 10, and each sieve is independently optimized by the control system.

The engine of the combine is any engine capable of operating the combine and preferably all the various components (rotor/cylinder, fan, drive train, etc.). Preferably, the engine is a diesel, bio-fuel, or gasoline engine. Alternately, an electric motor driven combine may also be used powered by various means, for example battery or fuel cells.

The Control System

The control system is a device that is capable of controlling ground speed, rotor/cylinder speed, fan speed, the size of the sieve openings, and the concave setting. Preferably, the control system is an electronic device. In a preferred embodiment, a computer, an ASIC (application specific integrated circuit), a microcontroller, or a combination thereof are used to control the system. The control system is in communication with a means for adjusting: the engine speed, the rotor/cylinder speed, the fan speed, the sieve openings, and the concave setting, preferably via a bus, serial or parallel data connection, or wirelessly. In a preferred embodiment, the control system is connected to an existing CAN (controller area network) bus of a combine. Preferably, the control system has memory storage capable of storing a loop count, program pointer, as well as various registers and an arithmetic control unit capable of performing register addition/subtraction/multiplication/division, etc. Preferably, flash memory, hard disk, or other storage media is used to store a computer program performing the various calculations and controls to optimize combine operations. In one embodiment, a series of lights, CRT, or LCD, for example, may be used to display information to the operator.

A control system was constructed using LabView® on a Microsoft Windows® based industrial computer which connected to the CAN bus of a standard combine. Preferably, the control system would be embedded in an integrated circuit board and resides in the on-board combine computer or reside in a dedicated solid-state computer. Preferably, the separator loss, sieve loss, and engine load are monitored at least once every second. The timing the of rotor loss or sieve loss routines is preferably optimized depending on the response to the machinery adjustments (e.g., rotor speed, fan speed, sieve opening, etc.).

Separator Loss Target, Engine Load Target, Sieve Loss Target

The separator loss target, engine load target, and sieve loss target are targets selected by an operator, manufacturer, mechanic, other personnel, or a combination thereof, preferably selected before operation. In one embodiment, the targets (separator loss target, engine load target, sieve loss target) are selectable by the operator of the combine via an interface connected to the control system. For example, keys, switches, dials may be used to select the desired target. Preferably, a keyboard and a screen (e.g. LCD, CRT, LED arrays, etc.) are used by the user to determine the existing target settings and select new target settings. In a preferred embodiment, a touch-screen is used by the user to determine the existing target settings and select new target settings.

Preferably, the separator loss target is a numeric representing the maximum acceptable amount of grain leaving the separator at the end of the rotor/cylinder. This numeric is assumed to be a predictor of grain that did not separate out and was discharged and lost with the MOG. Preferably, the separator loss target represents grain counted by a piezoelectric sensor, or grain counted by a spectral reflectance sensor, or any other means of sensing the grain over a given time period. For example, in one embodiment, the separator loss target is 20 impacts on a piezoelectric sensor per second.

Preferably, the sieve loss target is a numeric representing the maximum acceptable amount of grain leaving the rear of the sieves and lost with the MOG. Preferably, the sieve loss target relates to grain impacts counted by a piezoelectric sensor, or grain counted by a spectral reflectance sensor, or any other means of sensing the grain. For example, in one embodiment, the sieve loss target is 20 impacts on a piezoelectric sensor per second.

Preferably, the engine load target is a percentage the maximum engine load, whereby 100% is the maximum engine load under normal operating conditions. In a preferred embodiment, the engine load target starts at about 85 percent of total engine load under normal operating conditions and is later optimized by the control system.

FIG. 1

FIG. 1 depicts a flowchart of the operation of one embodiment of an autonomous combine control system. In the embodiment shown in FIG. 1, first in step 1, a separator loss target, engine load target, and a sieve loss target are selected. Preferably, the separator loss target, the engine load target, and the sieve loss target are selected in step 1 by a computer controlled interface either adjustable by the operator during harvesting or adjustable by the farm owner or manager. Then in step 2 the components of the combine separating system (rotor/cylinder speed and concave setting) and the combine cleaning system (fan speed, upper sieve opening, and lower sieve opening) are initialized to starting positions. Preferably these starting positions are based on manufacturer recommended settings for the current crop. Alternately, these settings are based on optimized settings from previous operation of the combine control system. Then in step 3, the feeder is engaged and the header is lowered. Then in step 5, the ground speed of the combine is increased until the selected engine load target is reached. Then in step 9, if the separator loss is greater than the separator loss target then the rotor/cylinder speed, the concave setting, engine load target, or a combination thereof are adjusted in step 11, preferably using the process shown in FIG. 3. Finally, after the rotor/cylinder speed, the concave setting, engine load target, or a combination thereof are adjusted in step 11, the system returns to step 5.

In step 9, if the separator loss is not greater than the separator loss target, then a determination is made as to whether the sieve loss is greater than the sieve loss target in step 13. In step 13, if the sieve loss is greater than the sieve loss target then the system moves to step 15 where the fan speed, size of the sieve openings, engine load target, or a combination thereof are adjusted, preferably using the process shown in FIG. 5. After step 15, the system returns to step 5. In step 13, if the sieve loss is not greater than the sieve loss target, then the system returns to step 5.

FIG. 2

Figure 2:
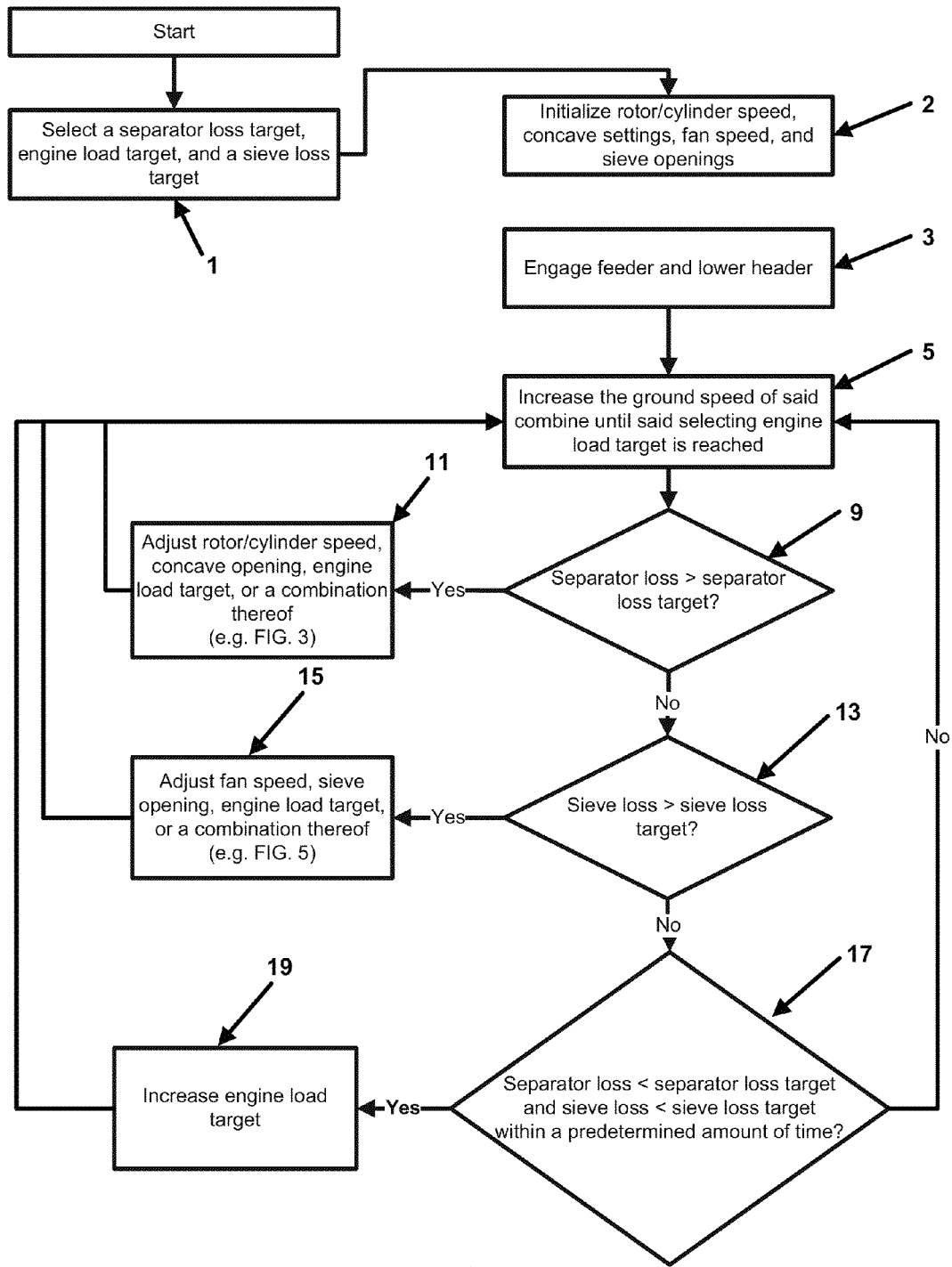
FIG. 2 depicts a flowchart of the operation of one embodiment of an autonomous grain combine control system having an extra optimizing routine.

FIG. 2 depicts a flowchart of the operation of one embodiment of an autonomous combine control system having an extra optimizing routine. In the embodiment shown in FIG. 2, step 17 and step 19 are added in order to maximize the efficiency of the system by increasing the engine load target, thereby maximizing the energy efficiency. This embodiment is preferable in uses where there will be constant changes in operating conditions, as the system will be able to quickly increase production in response to an easier load. Examples of such uses include, but are not limited to: fields with various hills, crop densities, crop heights, crop types, crop quality, etc.

In the embodiment shown in FIG. 2, the system has the steps described in FIG. 1 with the addition of step 17 and step 19, which implement an optimizing routine. In step 13, if the sieve loss is not greater than the sieve loss target, instead of returning to step 5 (as done in the embodiment shown in FIG. 1), the system runs through step 17. In step 17, if the separator loss is less than the separator loss target and the sieve loss is less than the sieve loss target for more than a predetermined amount of time, then the engine load target is increased by a predetermined amount of engine load increase and then the system returns to step 5. Preferably, the predetermined amount of time is one consecutive minute and the predetermined amount of engine load increase is a 5% increase in the existing engine load target. In step 17, if the separator loss is not less than the separator loss target or the sieve loss is not less than the sieve loss target for more than a predetermined amount of time, then the system returns to step 5.

FIG. 3

Figure 3:
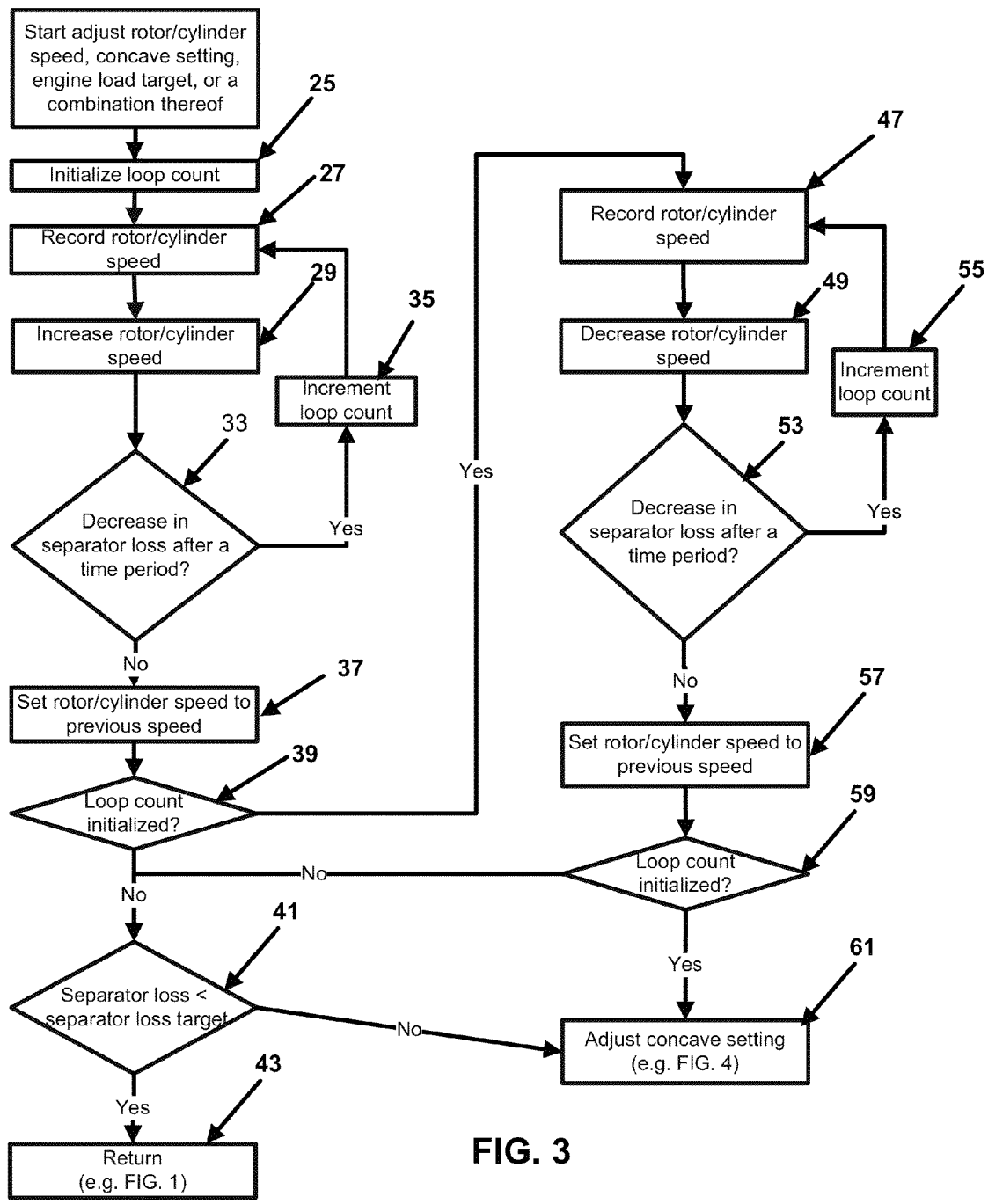
FIG. 3 depicts a flowchart of the operation of one embodiment of a step for adjusting rotor/cylinder speed for one embodiment of an autonomous grain combine control system.

FIG. 3 depicts a flowchart of the operation of one embodiment of the first sequence in correcting rotor loss by adjusting rotor/cylinder speed for one embodiment of an autonomous combine control system. In the embodiment shown in FIG. 3, first a loop count is initialized, preferably to zero, in step 25.

A loop count is any variable (e.g. memory/disk storage, register value) that at least has an initialized state and an uninitialized state. Preferably, the loop count is simply an integer stored value that is initialized at zero and subsequently incremented after each iteration through the loop. Other embodiments may be used, for example decrementing a loop count variable, initializing at a value other than zero, or a combination thereof.

After step 25, the rotor/cylinder speed is recorded in step 27. Then the rotor/cylinder speed is increased in step 29. Then a determination is made in step 33 as to whether there was a decrease in separator loss after a predetermined time period, preferably about 15 seconds. In step 33, if there was a decrease in separator loss, the loop count is incremented in step 35, and the system returns to step 29 where the rotor/cylinder speed is recorded.

In step 33, if there was not a decrease in separator loss, then in step 37, the rotor/cylinder is set to the speed of the previous rotor/cylinder speed (recorded in step 27). Then in step 39, if the loop count is not its initialized value (preferably if the loop count is greater than zero), then the system moves to step 41. In step 41, if the separator loss is less than the separator loss target, then the system returns in step 43 to the main control (e.g. FIG. 1). However, in step 41, if the separator loss is not less than the separator loss target, then the system moves to step 61 where the concave is adjusted, preferably using the embodiment shown in FIG. 4.

In step 39, if the loop count is in its initialized value (preferably if the loop count is zero), then the system moves to step 47. The rotor/cylinder speed is recorded in step 47. Then the rotor/cylinder speed is decreased in step 49. Then a determination is made in step 53 as to whether there was a decrease in separator loss after a predetermined time period, preferably about 15 seconds. In step 53, if there was a decrease in separator loss, the loop count is incremented in step 55, and the system returns to step 47 where the rotor/cylinder speed is recorded.

In step 53, if there was not a decrease in separator loss, then in step 57 the rotor/cylinder is set to the speed of the previous rotor/cylinder speed (recorded in step 47). Then in step 59, if the loop count is not its initialized value (preferably if the loop count is greater than zero), then the system moves to step 41. However, in step 59, if the loop count is its initialized value (preferably if the loop is still zero), then the system preferably moves to a system for adjusting the concave in step 61 (e.g. the system shown in FIG. 4).

FIG. 4

Figure 4:
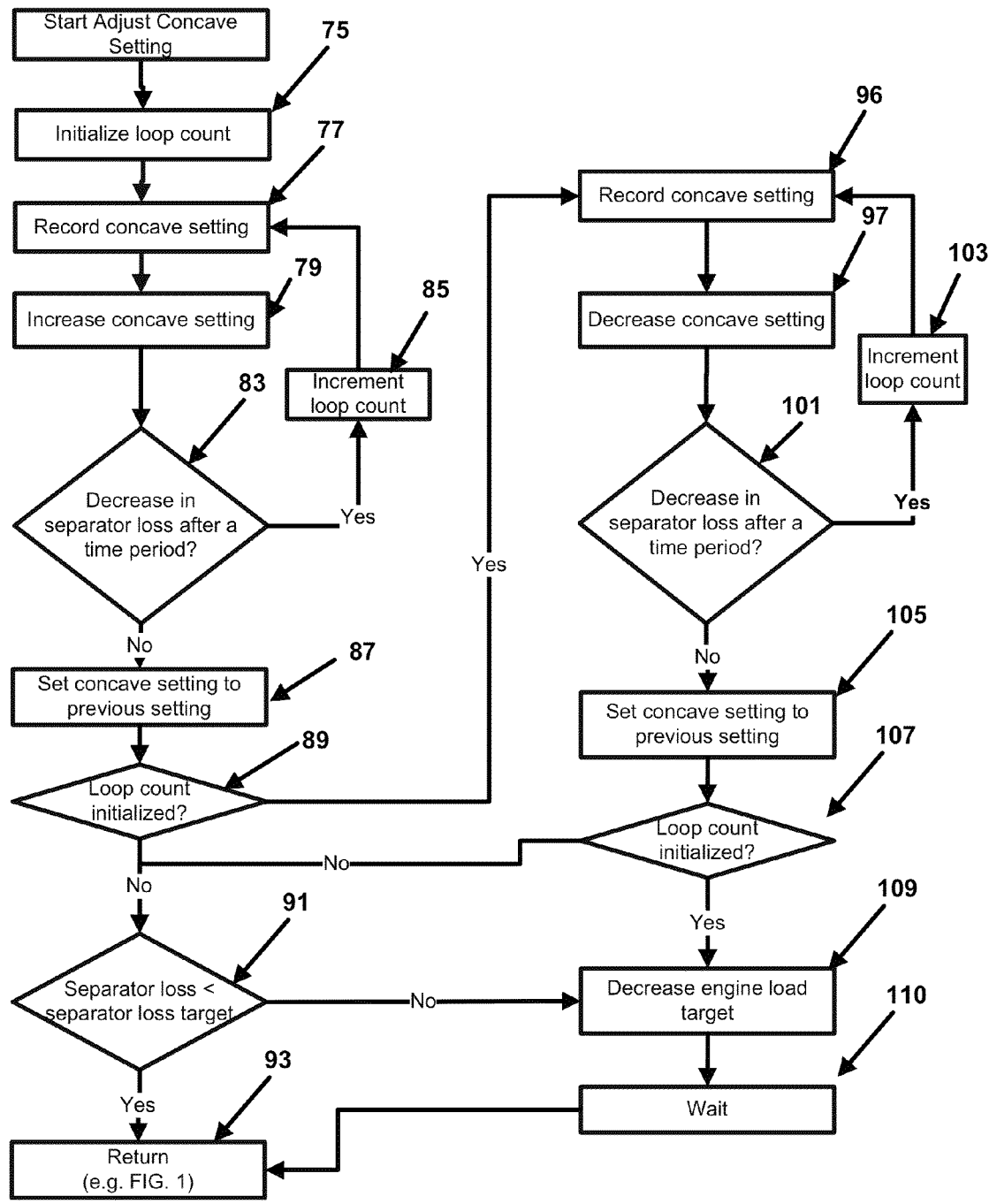
FIG. 4 depicts a flowchart of the operation of one embodiment of a step for adjusting the concave setting.

FIG. 4 depicts a flowchart of the operation of one embodiment of the second sequence in correcting rotor loss by adjusting the concave setting for one embodiment of an autonomous combine control system. In the embodiment shown in FIG. 4, first a loop count is initialized, preferably to zero, in step 75 and the concave setting is recorded in step 77. Then the concave setting is increased in step 79. Then a determination is made in step 83 as to whether there was a decrease in separator loss after a predetermined time period, preferably about 15 seconds. In step 83, if there was a decrease in separator loss, the loop count is incremented in step 85, and the system returns to step 77 where the concave setting is recorded.

In step 83, if there was not a decrease in separator loss, then in step 87 the concave setting is set to the previously recorded concave setting (recorded in step 77). Then in step 89, if the loop count is not its initialized value (preferably if the loop count is greater than zero), then the system moves to step 91. In step 91, if the separator loss is less than the separator loss target, then the system moves to step 93 where it returns to the main control (e.g. step 5 in FIG. 1). However, in step 91, if the separator loss is not less than the separator loss target, then the system moves to step 109 where the engine load target is decreased, and after a waiting period in step 110, the system returns to the main control (e.g. step 5 in FIG. 1) in step 93.

In step 89, if the loop count is its initialized value (preferably if the loop count is zero), then the system moves to step 96 where the concave setting is recorded. Once the concave setting is recorded in step 96, the concave setting is decreased in step 97. Then a determination is made in step 101 as to whether there was a decrease in separator loss after a predetermined time period, preferably about 15 seconds. In step 101, if there was a decrease in separator loss, the loop count is incremented in step 103, and the system returns to step 96 where the concave setting is recorded.

In step 101, if there was not a decrease in separator loss, then in step 105 the concave setting is set to the previously recorded concave setting (recorded in step 96). Then in step 107, if the loop count is not its initialized value (preferably if the loop count is greater than zero), then the system moves to step 91. However, in step 107, if the loop count is its initialized value (preferably if the loop is still zero), then the system preferably moves to step 109 where the engine load target is decreased. Then after a wait period in step 110, the system moves to step 93 where it returns to the main control (e.g. step 5 in FIG. 1).

FIG. 5

Figure 5:
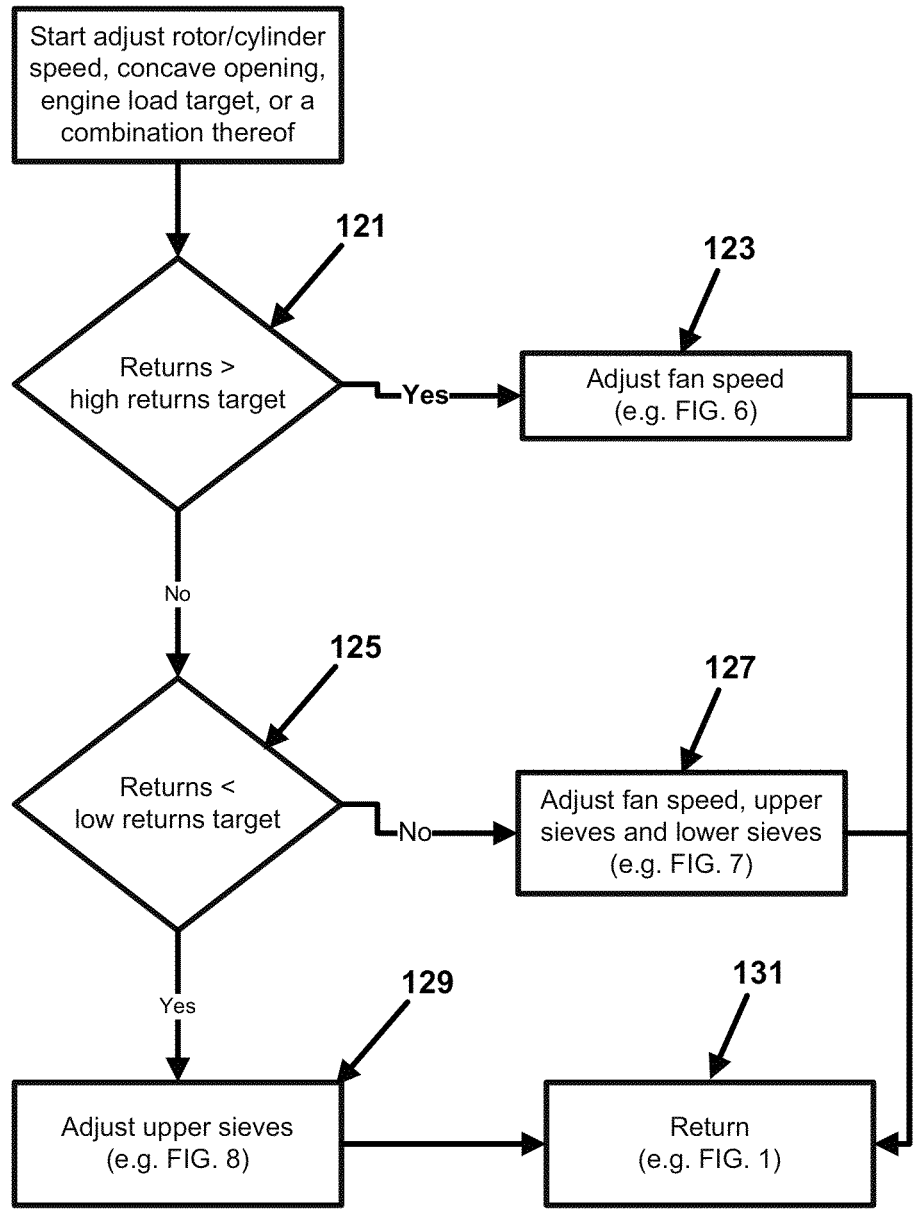
FIG. 5 depicts a flowchart of the operation of one embodiment of a step for adjusting rotor/cylinder speed, the concave setting, engine load target, or a combination thereof.

FIG. 5 depicts a flowchart of the operation of one embodiment of the first sequence in correcting sieve loss by adjusting fan speed, upper sieve opening, lower sieve opening, engine load target, or a combination thereof. In this embodiment, the upper sieve is preferably used to first separate the grain from the remaining MOG. Grain falling through the upper sieve is then passed through lower sieve, which is designed to pass the grain. Preferably, the lower sieve has smaller opening sizes than the upper sieve. In the alternative, a single sieve may be used, whereby the single sieve represents both the upper sieve and the lower sieve in the below described systems.

In this embodiment, the system constantly monitors the returns, the return grain and MOG having passed through the concave and upper sieves and over the lower sieve to the end of the cleaning system of the combine. At this point, preferably the combine returns the uncleaned grain to the cleaning system. The amount returned is the returns volume, preferably monitored as a percentage of the full deflection of a paddle feeder in the returns auger.

Figure 7:
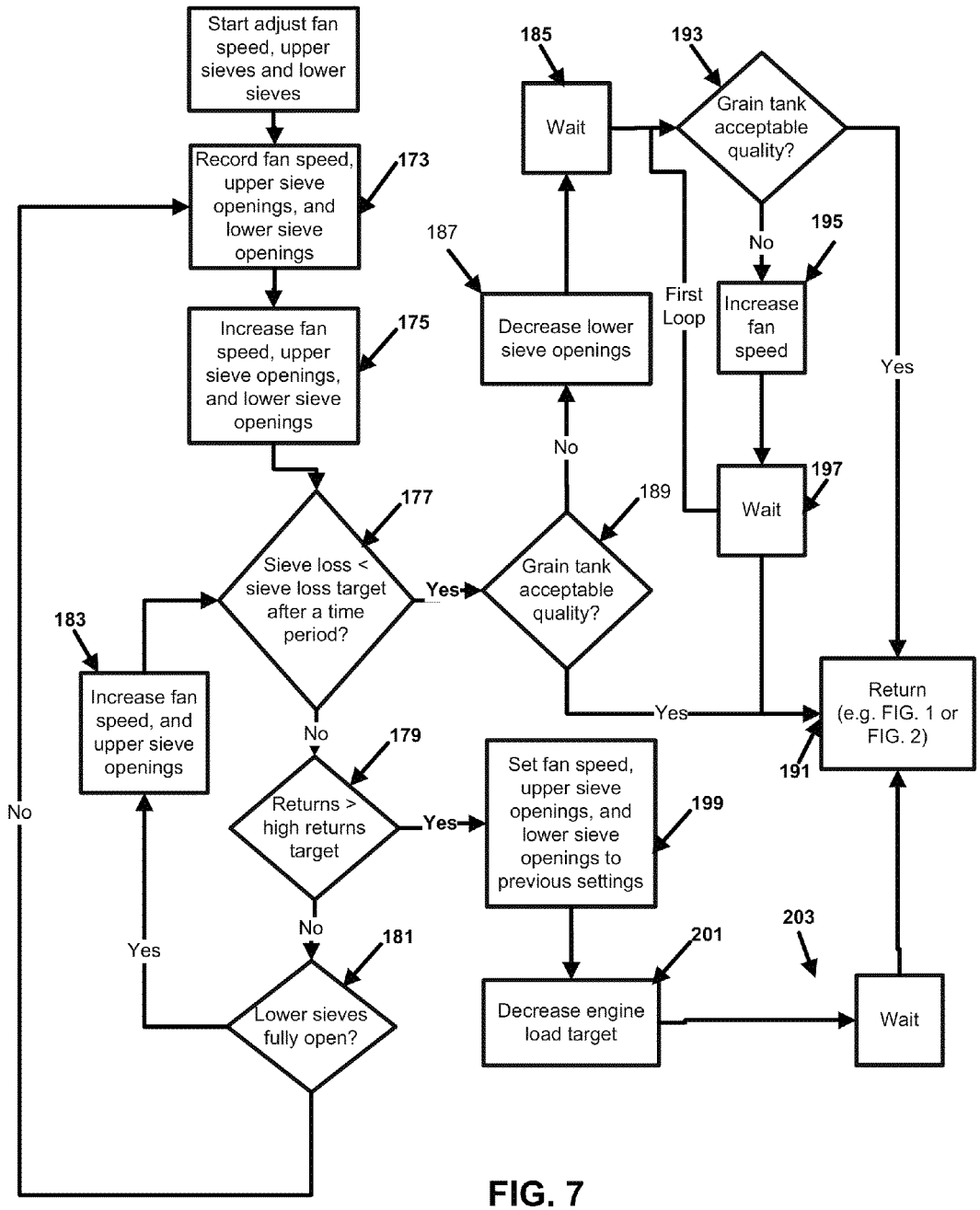
FIG. 7 depicts a flowchart of the operation of one embodiment of a step for adjusting the fan speed, size of the upper sieve openings, and size of the lower sieve openings.
Figure 8:
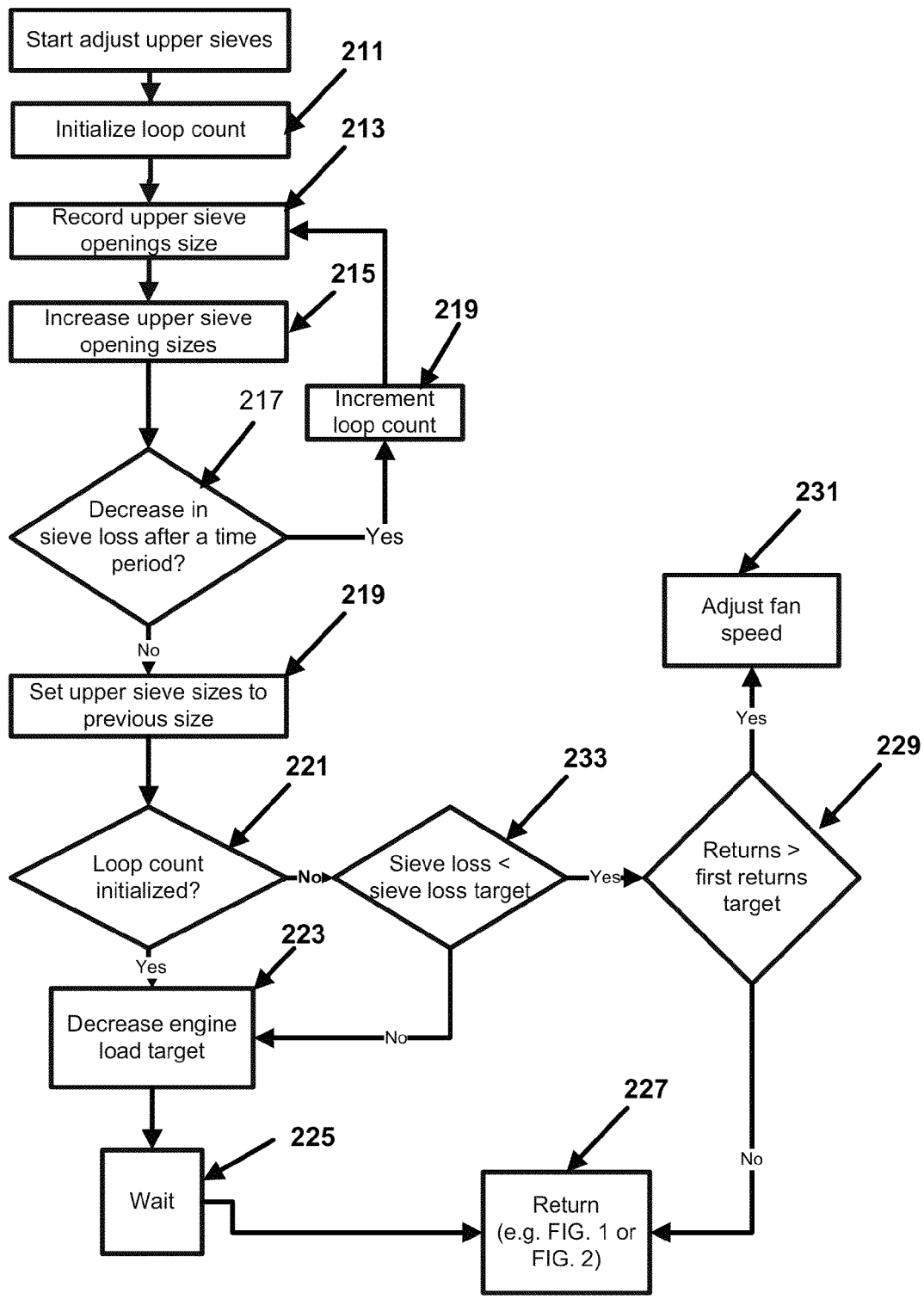
FIG. 8 depicts a flowchart of the operation of one embodiment of a step for adjusting the size of the upper sieve openings.

In the embodiment shown in FIG. 5, control is passed preferably from step 15 in FIG. 1. In step 121, if the returns volume is greater than the high returns volume target then the fan speed is adjusted in step 123 (preferably using the system shown in FIG. 6). In step 121, if the returns volume is not greater than the high returns volume target then the system moves to step 125. Preferably, the high returns volume target is 70% (deflection). In step 125, if the returns volume is less than a low returns volume target then the upper sieves are adjusted in step 129 (preferably using the system as shown in FIG. 8). Preferably, the low returns volume target is 30% (deflection). In step 125, if the returns volume is not less than the low returns volume target then the fan speed, upper sieve and lower sieve are adjusted in step 127 (preferably using the system as shown in FIG. 7). Finally, after either adjusting the fan speed in step 123, adjusting the fan speed, size of the upper sieve openings and size of the lower sieve openings in step 127, or adjusting the size of the upper sieve openings in step 129, control is returned in step 131, preferably to step 5 in FIG. 1.

FIG. 6

Figure 6:
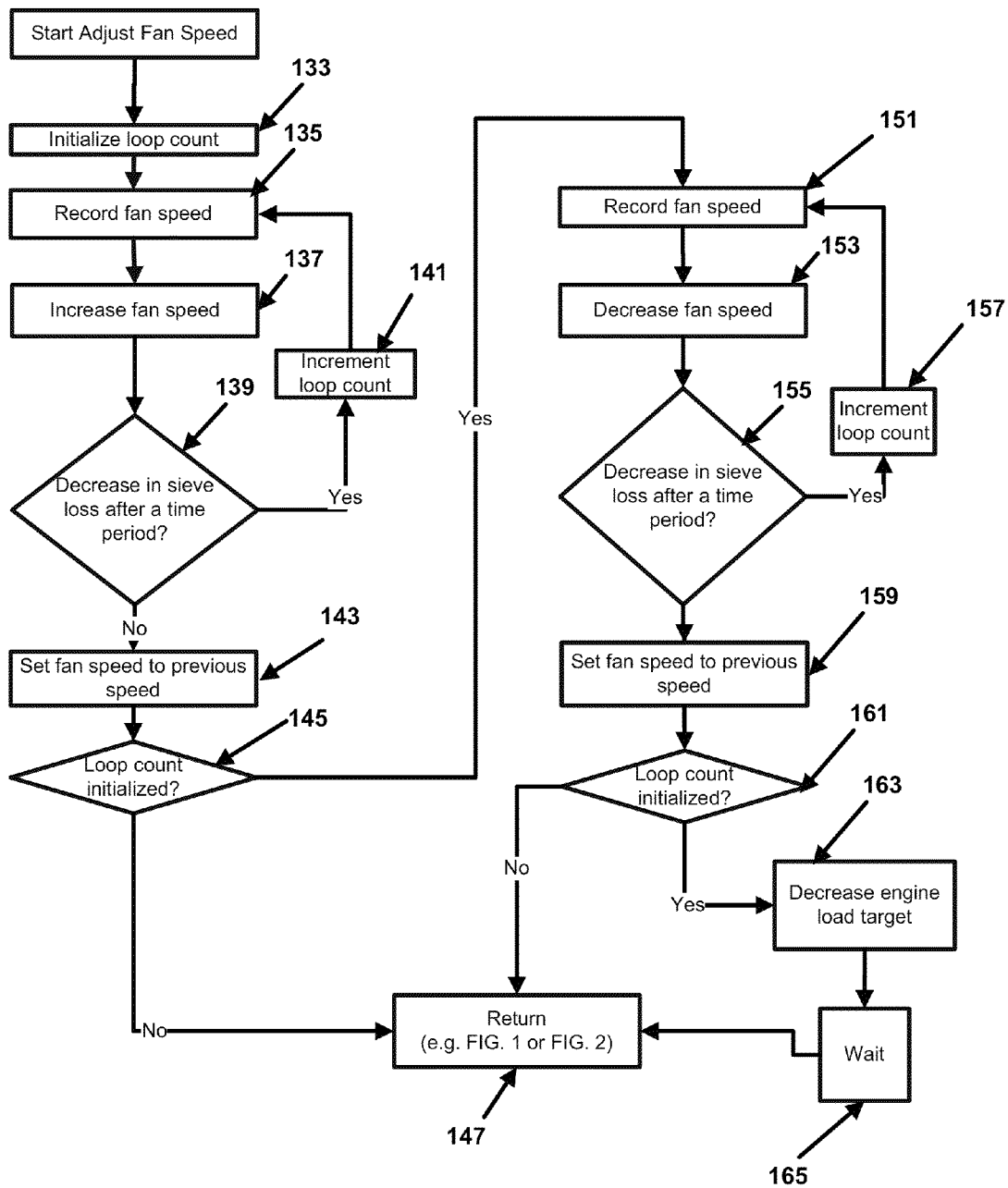
FIG. 6 depicts a flowchart of the operation of one embodiment of a step for adjusting the fan speed.

FIG. 6 depicts a flowchart of the operation of one embodiment of a step for adjusting the fan speed in step 123 in FIG. 5, which reduces sieve loss when the returns volume is high. In the embodiment shown in FIG. 6, control is passed preferably from step 123 in FIG. 5. In step 133, a loop count is initialized. Then in step 135, the fan speed is recorded. Then in step 137, the fan speed is increased. In step, 139, if there is a decrease in sieve loss after a predetermined time period, the loop count is incremented in step 141 and the system resumes at step 135. In step 139, if there is not a decrease in sieve loss after a predetermined time period, the fan speed is set to the previously recorded fan speed in step 143.

Then in step 145, if the loop count still has its initialized value, the system moves to step 151 where the fan speed is recorded. In step 145, if the loop count does not still have its initialized value, the system moves to step 147, where the system returns, preferably to step 5 in FIG. 1 or FIG. 2.

In step 151, the fan speed is recorded. Then in step 153, the fan speed is decreased. In step 155, if there is a decrease in sieve loss after a predetermined time period, the loop count is incremented in step 157 and the system resumes at step 151. In step, 155, if there is not a decrease in sieve loss after a predetermined time period, the fan speed is set to the previously recorded fan speed in step 159.

Then in step 161, if the loop count still has its initialized value, the system moves to step 163 where the engine load target is decreased and after a predetermined time period waiting in step 165, the system moves to step 147, where the system preferably returns to step 131 from step 123 in FIG. 5. In step 161, if the loop count does not still have its initialized value, the system moves to step 147, where the system preferably returns to step 131 from step 123 in FIG. 5.

FIG. 7

FIG. 7 depicts a flowchart of the operation of one embodiment of a step for adjusting the fan speed, size of the upper sieve openings, and size of the lower sieve openings in step 127 in FIG. 5, which reduces sieve loss when the returns volume is neither high nor low. In the embodiment shown in FIG. 7, control is passed preferably from step 127 in FIG. 5. First, in step 173, the fan speed, size of the upper sieve openings, and size of the lower sieve openings is recorded. Then in step 175, the fan speed, size of the upper sieve openings and size of the lower sieve openings are increased. Then in step 177, if the sieve loss is not less than the sieve loss target after a predetermined time period, the system moves to step 179. In step 179, if the returns volume is not greater than the high returns volume target (the high returns volume, preferably 70%), then the system continues in step 181. In step 181, if the lower sieves have been opened from the initialized setting (from step 2 in FIG. 5), then the system returns to step 173.

In step 177, if the sieve loss is less than the sieve loss target after a predetermined time period, the system moves to step 189. In step 189, if the grain tank sample is of acceptable quality, the system moves to step 191, where the system returns, preferably to step 5 in FIG. 1 or FIG. 2. The grain is of acceptable quality when the operator determines that the grain is of a quality normally accepted in the industry, therefore having an acceptable amount of MOG. Preferably, an acceptable quality is having less than 10% MOG.

In step 189, if the grain tank sample is not of acceptable quality, the system moves to step 187, where the size of the lower sieve openings is decreased. Then after waiting in step 185, a determination is made as to whether the grain tank sample is of acceptable quality in step 193. In step 193, if the grain sample is of acceptable quality, the system moves to step 191, where the system returns, preferably to step 5 in FIG. 1 or FIG. 2. In step 193, if the grain sample is not of acceptable quality, the fan speed is increased in step 195, and after waiting in step 197, the system returns to step 193. Upon the second instance of step 195 whereby the fan speed is increased the system moves to step 191, where the system returns, preferably to step 5 in FIG. 1 or FIG. 2.

In step 179, if the returns volume is greater than the high returns volume target, then the system continues to step 199. In step 199, the fan speed, size of the upper sieve openings, and size of the lower sieve openings are set to their previous settings. Then in step 201, the engine load target is decreased, and after waiting in step 203, the system moves to step 191, where the system returns, preferably to step 5 in FIG. 1 or FIG. 2.

FIG. 8

FIG. 8 depicts a flowchart of the operation of one embodiment of a step for adjusting the upper sieves in step 129 in FIG. 5, which reduces sieve loss when the returns volume is low. First, a loop counter is initialized in step 211. Then the size of the upper sieve openings is recorded in step 213. Then the size of the upper sieve openings is increased in step 215. Then if there was a decrease in sieve loss after a predetermined time period in step 217, the loop count is incremented in step 219 and the system returns to step 213.

If there was not a decrease in sieve loss after a predetermined time period in step 217, the upper sieve opening size is set to the previous size in step 219. Then if the loop count was not changed from its initialized value, the engine load target is decreased in step 223, and after waiting in step 225 for a period of time, the system returns in step 227, preferably back to step 5 in FIG. 1 or FIG. 2.

In step 221, if the loop count was changed from its initialized value, a determination is made in step 233 as to whether the monitored sieve loss is less than the sieve loss target. In step 233, if the monitored sieve loss is not less than the sieve loss target, then the system moves to step 223 where the engine load target is decreased and after waiting in step 225 for a period of time, the system returns in step 227, preferably back to step 5 in FIG. 1 or FIG. 2.

In step 233, if the monitored sieve loss is less than the sieve loss target, then a determination is made as to whether the returns volume is greater than the high returns volume target in step 229. In step 229, if the returns volume is greater than the returns volume target, then the fan speed is adjusted in step 231, preferably using the system shown in FIG. 6. In step 229, if the returns volume is not greater than the returns volume target, then the system returns in step 227, preferably back to step 5 in FIG. 1 or FIG. 2.

FIG. 9

FIG. 9 depicts a perspective view of one embodiment of a combine 241. Preferably, the combine 241 is used to process corn, rice, wheat, barely, sorghum, millets, oats, rye, buckwheat, etc.; however the combine 241 can be used to process any grain. Furthermore, it should be noted that the above identified embodiments can be applied to any device to optimally process grain. The combine 241 is used to extract grain from a field, separating out the grain from the MOG. As the combine 241 proceeds through a field, the header 243 cuts the grain with a header cutter 245 as the combine passes through the field. The cut crop is then moved to the header auger 249 with the assistance of a header reel 247.

During harvesting, it may be desirable for the operator to have the ability to inspect the grain in the grain tank 257. For example, during the process shown in FIG. 7, the operator must determine if the grain present in the grain tank 257 is of acceptable quality (having an acceptable amount of the grain relative to the MOG). In one embodiment, this is simply a viewing window for the operator to look into the grain tank 257. In another embodiment, shown in FIG. 9, a sensing device 258 is used to provide grain quality information to the operator in the cab. The sensing device may be a camera that sends an image to the operator for visual inspection, or the image may be processed by a control system to automatically determine the quality of the harvested grain in the grain tank. Alternately, the sensing device may use characteristics such as spectral reflectivity properties of the harvested grain for differentiating grain and MOG for determination of grain quality. Preferably, the determination of grain quality is optimized for each type of grain.

FIG. 10

FIG. 10 depicts a cut-out perspective view of one embodiment of a combine 241. The header auger 249 moves the cut crop into the separator 251 (FIG. 9), preferably with the help of a feeder 265. The separator 251 (FIG. 9) rubs the grain between rotors 253 and concaves 255 surrounding the rotors 253 in order to separate the grain from the MOG. FIG. 9 and FIG. 10 depict an embodiment having two rotors 253, each rotor 253 surrounded by a corresponding concave 255, however any number (including one rotor/cylinder) of rotor/cylinders 253 and their corresponding concaves 255 may be used.

The grain and MOG falls through the concaves 255 onto the grain pan 267, where the grain and MOG proceed through the combine cleaning system. Grain and MOG that does not fall through the concave 255 passes to a rear beater 277 and is expelled out of the combine or into another component of the combine for further processing. A separator loss sensor 281 detects grain that falls through the concave near the end of the rotor. The separator loss sensor 281 is a device sensitive to the grain. In a preferred embodiment, the grain is corn and the separator loss sensor 281 is a piezoelectric transducer, or other device sensitive to the relatively hard (compared to the MOG, e.g. chaff) corn kernels hitting the separator loss sensor 281. U.S. Pat. No. 7,367,880, hereby fully incorporated by reference is a preferred separator loss sensor 281.

In the combine cleaning system the grain and MOG move from the grain pan 267, over a cleaning fan and onto an upper sieve 259. The grain will pass through the upper sieve 259 onto the lower sieve 263. A fan 261 blows up through or across the upper sieve 259 and the lower sieve 263 separates much of the lighter MOG while the heavier grain is allowed to fall through both the upper sieve 259 and lower sieve 263. Once the grain falls through lower sieves 263 it is transported via a grain auger 261 to an elevator 271 and into the grain tank (257 in FIG. 9).

Grain and MOG that does not fall through the upper sieve 259 and the lower sieve 263 will be expelled out the back of the combine 241 or into another component of the combine for further processing and/or transport. Before being expelled, a sieve loss sensor 269 positioned off the back of the upper sieve 259 detects the presence of grain. The sieve loss sensor 269 is a device sensitive to the grain. In a preferred embodiment, the grain is corn and the sieve loss sensor 269 is a piezoelectric transducer, or other device sensitive to the relatively hard (compared to the MOG, e.g. chaff) corn kernels hitting the sieve loss sensor 269.

Grain and MOG that passes through the upper sieve, but does not fall through the lower sieve 263 will fall off the end of the lower sieve 263 to a returns auger (shown but not numbered in FIG. 10) and directed to a returns elevator 273 that returns the grain and MOG to the grain pan 267. While passing through the returns elevator 273 a returns sensor 275, will determine the returns, the amount of grain and MOG returning to the grain pan 267. The returns sensor 275 is a device sensitive to the mass of material passing through the returns elevator 273. In a preferred embodiment the returns sensor 275 is a sensor detecting the angular deflection of a paddle on the drive of the returns elevator 273.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C.§112, ¶6. In particular, the use of "step of" in the claims herein is not intended to invoke the provisions of 35 U.S.C.§112, ¶6.

The embodiment of the invention in which an exclusive property or privilege is claimed is defined as follows:

1. A method for controlling a grain combine comprising:
   a. providing a grain combine comprising a rotor/cylinder, a sieve, a fan, a concave, a feeder, a header, an engine, and a control system; said concave having a concave setting related to the concave's distance from said rotor/cylinder; said sieve having a plurality of openings; said control system having a means for controlling the size of said openings of said sieve, the speed of said fan, the speed of said rotor/cylinder, and said concave setting;
   b. engaging said feeder and lowering said header;
   c. selecting a separator loss target, engine load target, and a sieve loss target;
   d. increasing the ground speed of said grain combine until said selected engine load target is reached;
   e. harvesting a grain with said lowered header and said engaged feeder of said grain combine after said selected engine load target is reached;
   f. continuously monitoring separator loss, sieve loss, engine load, and ground speed of said grain combine during said step of harvesting;
   g. determining said monitored separator loss is greater than said selected separator loss target, and performing an adjustment from the group of adjustments consisting of: adjusting the speed of said rotor/cylinder, adjusting said concave setting, adjusting said engine load target, and combinations thereof;
   h. determining said monitored sieve loss is greater than said selected sieve loss target, and performing an adjustment from the group of adjustments consisting of: adjusting the speed of said fan, adjusting the size of said openings of said sieve, adjusting said engine load target, and combinations thereof;
   i. said control system performing said step of determining said monitored separator loss is greater than said selected separator loss target and said step of determining said monitored sieve loss is greater than said selected sieve loss target; and
   j. whereby said step of determining said monitored sieve loss is greater than said selected sieve loss target comprises determining said monitored sieve loss is greater than said selected sieve loss target comprises and then:
      a. monitoring returns volume;
      b. said sieve comprises an upper sieve and a lower sieve;
      c. said upper sieve comprising a plurality of openings;
      d. said lower sieve comprising a plurality of openings;
      e. determining said monitored returns volume is greater than a high returns volume target and then adjusting the speed of said fan;
      f. determining said monitored returns volume is not greater than said high returns volume target and said monitored returns volume is not less than a low return loss target and then adjusting the speed of said fan and the size of said openings of said lower sieve; and
      g. determining said monitored returns volume is not greater than said high return loss target and said monitored returns volume is less than said low returns volume target and then adjusting said upper sieves.

2. The method of controlling a grain combine of claim 1 whereby said control system is a computer, microcontroller, application specific integrated circuit or other electronic means of control.

3. The method of controlling a grain combine of claim 1 further comprising:
   a. determining both said monitored separator loss is less than said selected separator loss target, and said monitored sieve loss is less than said selected sieve loss target for at least sixty consecutive seconds and then increasing said engine load target.

4. The method of controlling a grain combine of claim 1 whereby said step of determining said monitored separator loss is greater than said selected separator loss target comprises determining said monitored separator loss is greater than said selected separator loss target and then:
   a. recording the speed of said rotor/cylinder;
   b. increasing the speed of said rotor/cylinder after said step of recording the speed of said rotor/cylinder; and
   c. waiting a first predetermined amount of time after said step of increasing the speed of said rotor/cylinder;
   d. repeating steps a-c until said monitored separator loss has not decreased after said step of increasing the speed of said rotor/cylinder and after said step of waiting a first predetermined amount of time; and then
   e. resetting the speed of said rotor/cylinder to said recorded rotor/cylinder speed after said step of repeating steps a-c.

5. The method of controlling a grain combine of claim 1 whereby said step of determining said monitored separator loss is greater than said selected separator loss target comprises determining said monitored separator loss is greater than said selected separator loss target and then:
   a. recording the speed of said rotor/cylinder;
   b. decreasing the speed of said rotor/cylinder after said step of recording the speed of said rotor/cylinder;
   c. waiting a second predetermined amount of time after said step of decreasing the speed of said rotor/cylinder;
   d. repeating steps a-c until said monitored separator loss has not decreased after said step of decreasing the speed of said rotor/cylinder and after said step of waiting a second predetermined amount of time; and
   e. resetting the speed of said rotor/cylinder to said recorded rotor/cylinder speed after said step of repeating steps a-c.

6. The method of controlling a grain combine of claim 4 whereby said step of determining said monitored separator loss is greater than said selected separator loss target comprises determining said monitored separator loss is greater than said selected separator loss target and then:
   a. recording the speed of said rotor/cylinder;
   b. decreasing the speed of said rotor/cylinder after said step of recording the speed of said rotor/cylinder;
   c. waiting a second predetermined amount of time after said step of decreasing the speed of said rotor/cylinder;
   d. repeating steps a-c until said monitored separator loss has not decreased after said step of decreasing the speed of said rotor/cylinder and after said step of waiting a second predetermined amount of time; and e. resetting the speed of said rotor/cylinder to said recorded rotor/cylinder speed after said step of repeating steps a-c.

7. The method of controlling a grain combine of claim 1 whereby said step of determining said monitored separator loss is greater than said selected separator loss target further comprises determining said monitored separator loss is greater than said selected separator loss target and then:
   a. recording said concave setting;
   b. increasing said concave setting after said step of recording said concave setting;
   c. waiting a third predetermined amount of time after said step of increasing said concave setting;
   d. repeating steps a-c until said monitored separator loss has not decreased after said step of increasing said concave setting after said step of waiting a third predetermined amount of time; and
   e. resetting said concave setting to said recorded concave setting after said step repeating steps a-c.

8. The method of controlling a grain combine of claim 1 whereby said step of determining said monitored separator loss is greater than said selected separator loss target further comprises determining said monitored separator loss is greater than said selected separator loss target and then:
   a. recording said concave setting;
   b. decreasing said concave setting after said step of recording said concave setting;
   c. waiting a fourth predetermined amount of time after said step of decreasing said concave setting;
   d. repeating steps a-c until said monitored separator loss has not decreased after said step of decreasing said concave setting after said step of waiting a fourth predetermined amount of time; and
   e. resetting said concave setting to said recorded concave setting after said step of repeating steps a-c.

9. The method of controlling a grain combine of claim 7 whereby said step of determining said monitored separator loss is greater than said selected separator loss target further comprises determining said monitored separator loss is greater than said selected separator loss target and then:
   a. recording said concave setting;
   b. decreasing said concave setting after said step of recording said concave setting;
   c. waiting a fourth predetermined amount of time after said step of decreasing said concave setting;
   d. repeating steps a-c until said monitored separator loss has not decreased after said step of decreasing said concave setting after said step of waiting a fourth predetermined amount of time; and
   e. resetting said concave setting to said recorded concave setting after said step of repeating steps a-c.

10. The method of controlling a grain combine of claim 1 whereby said step of determining said monitored separator loss is greater than said selected separator loss target further comprises determining said monitored separator loss is greater than said selected separator loss target further and then:
    a. adjusting the speed of said rotor/cylinder, the speed of said fan, said concave setting, the size of said openings of said sieve, or a combination thereof; and then decreasing target engine load.

11. The method of controlling a grain combine of claim 1 whereby said step of determining said monitored returns volume is greater than said high returns volume target comprises determining said monitored returns volume is greater than said high returns volume target and then:
    a. recording the speed of said fan;
    b. increasing the speed of said fan after said step of recording the speed of said fan;
    c. waiting a fifth predetermined amount of time after said step of increasing the speed of said fan;
    d. repeating steps a-c until said monitored sieve loss has not decreased after said step of increasing the speed of said fan and after said step of waiting a fifth predetermined amount of time; and
    e. resetting the speed of said fan to said recorded speed of said fan after said step of repeating steps a-c.

12. The method of controlling a grain combine of claim 1 whereby said step of determining said monitored returns volume is greater than said high returns volume target comprises determining said monitored returns volume is greater than said high returns volume target and then:
    a. recording the speed of said fan;
    b. decreasing the speed of said fan after said step of recording the speed of said fan;
    c. waiting a sixth predetermined amount of time after said step of decreasing the speed of said fan;
    d. repeating steps a-c until said monitored sieve loss has not decreased after said step of decreasing the speed of said fan and after said step of waiting a sixth predetermined amount of time; and
    e. resetting the speed of said fan to said recorded speed of said fan after said step of repeating steps a-c.

13. The method of controlling a grain combine of claim 11 whereby said step of determining said monitored returns volume is greater than said high returns volume target comprises determining said monitored returns volume is greater than said high returns volume target and then:
    a. recording the speed of said fan;
    b. decreasing the speed of said fan after said step of recording the speed of said fan;
    c. waiting a sixth predetermined amount of time after said step of decreasing the speed of said fan;
    d. repeating steps a-c until said monitored sieve loss has not decreased after said step of decreasing the speed of said fan and after said step of waiting a sixth predetermined amount of time; and
    e. resetting the speed of said fan to said recorded speed of said fan after said step of repeating steps a-c.

14. The method of controlling a grain combine of claim 1 whereby said step of determining said monitored returns volume is not greater than said high returns volume target and said monitored returns volume is not less than said low returns volume target comprises determining said monitored returns volume is not greater than said high returns volume target and said monitored returns volume is not less than said low returns volume target and then:
    a. said step of harvesting a grain comprises placing grain within a grain tank;
    b. recording the speed of said fan, size of said openings of said upper sieve openings, size of the openings of said lower sieve, and size of the openings of said lower sieve;
    c. increasing the speed of said fan, the size of said openings of said upper sieve openings, size of the openings of said lower sieve, and the size of the openings of said lower sieve while said monitored sieve loss is not greater than said sieve loss target, said monitored returns volume is not greater than said high returns volume target and said sieves are at their initialized setting;
    d. increasing the speed of said fan and size of said openings of said upper sieve while said monitored sieve loss is not greater than said sieve loss target, said monitored returns volume is not greater than said high returns volume target and said lower sieves are open;

e. determining that said monitored sieve loss is not greater than said sieve loss target, and said monitored returns volume is greater than said high returns volume and then setting the speed of said fan, size of said openings of said upper sieve openings, size of the openings of said lower sieve, and size of the openings of said lower sieve to their respective recorded values and then decreasing said engine load target;

f. determining that the grain in the grain tank is of acceptable quality and then decreasing the size of the openings of said lower sieve; and g. determining that the grain in the grain tank is of acceptable quality and then increasing the speed of said fan.

15. The method of controlling a grain combine of claim 1 whereby said step of determining said monitored returns volume is not greater than said high returns volume target and said monitored returns volume is less than said low returns volume target comprises determining said monitored returns volume is not greater than said high returns volume target and said monitored returns volume is less than said low returns volume target and then:

a. recording the size of said openings of said upper sieve;

b. increasing the size of said openings of said upper sieve after said step of recording the size of said openings of said upper sieve;

c. waiting a seventh predetermined amount of time after said step of increasing the size of said openings of said upper sieve;

d. repeating steps a-c until said monitored sieve loss has not decreased after said step of increasing the size of said openings of said predetermined; and e. resetting the size of said openings of said upper sieve to said recorded size of said upper sieve after said step of repeating steps a-c.

16. The method of controlling a grain combine of claim 1 whereby said step of determining said monitored returns volume is not greater than said high returns volume target and said monitored returns volume is less than said low returns volume target comprises determining said monitored returns volume is not greater than said high returns volume target and said monitored returns volume is less than said low returns volume target and then decreasing said engine load target.

17. The method of controlling a grain combine of claim 1 whereby said step of determining said monitored returns volume is not greater than said high returns volume target and said monitored returns volume is less than said low returns volume target comprises determining said monitored returns volume is not greater than said high returns volume target and said monitored returns volume is less than said low returns target and then:

a. adjusting the size of said openings of said upper sieves; and b. determining that sieve loss is less than said monitored sieve loss target and said monitored returns volume is greater than said high returns volume target after said step of adjusting the size of said openings of said upper sieves and then adjusting the speed of said fan.

18. The method of controlling a grain combine of claim 15 whereby:

a. said step of determining said monitored returns volume is not greater than said high returns volume target and said monitored returns volume is less than said low returns volume target comprises determining said monitored returns volume is not greater than said high returns volume target and said monitored returns volume is less than said low returns volume target and then decreasing said engine load target; and b. said step of determining said monitored returns volume is not greater than said high returns volume target and said monitored returns volume is less than said low returns volume target comprises determining said monitored returns volume is not greater than said high returns volume target and said monitored returns volume is less than said low returns target and then:

i. adjusting the size of said openings of said upper sieves; and ii. determining that sieve loss is less than said monitored sieve loss target and said monitored returns volume is greater than said high returns volume target after said step of adjusting the size of said openings of said upper sieves and then adjusting the speed of said fan.

19. The method of controlling a grain combine of claim 1 wherein said sieve loss target is a numeric representing the maximum acceptable amount of grain leaving the rear of the sieves and lost with the material other than grain.

20. The method of controlling a grain combine of claim 19 wherein said sieve loss target is measured by: a piezoelectric sensor, a spectral reflectance sensor, or a means of sensing grain.

* * * * *